US005552190A

United States Patent [19]

Maruoka et al.

[11] Patent Number: 5,552,190

[45] Date of Patent: Sep. 3, 1996

[54] GOLF BALL AND METHOD OF MANUFACTURING THE SAME

[75] Inventors: Kiyoto Maruoka; Kuniyasu Horiuchi, both of Kobe; Yoshikazu Yabuki, Akashi, all of Japan

[73] Assignee: Sumitomo Rubber Industries, Ltd., Hyogo-ken, Japan

[21] Appl. No.: 553,830

[22] Filed: Nov. 6, 1995

Related U.S. Application Data

[63] Continuation-in-part of Ser. No. 163,720, Dec. 9, 1993, abandoned.

[30] Foreign Application Priority Data

Dec. 9, 1993 [JP] Japan .................................... 4-352542

[51] Int. Cl.[6] ............................. B01J 19/08; H01F 41/00

[52] U.S. Cl. .......................... 427/457; 427/475; 427/480; 427/481

[58] Field of Search .................................... 427/457, 475, 427/480, 481; 273/235 A

[56] References Cited

U.S. PATENT DOCUMENTS

| | | | |
|---|---|---|---|
| 4,000,333 | 12/1976 | Cwayna et al. | 427/325 |
| 4,532,148 | 7/1985 | Vecellio | 427/480 |
| 4,802,674 | 2/1989 | Kitaoh | 273/235 A |
| 4,871,589 | 10/1989 | Kitaoh | 273/235 A |

OTHER PUBLICATIONS

Patent Abstracts of Japan, vol. 014, No. 363 (C–0746) 7 Aug. 1990 & JP–A–01 131 786 (abstract).

*Primary Examiner*—Shrive Beck
*Assistant Examiner*—David M. Maiorana
*Attorney, Agent, or Firm*—Birch, Stewart, Kolasch & Birch LLP

[57] ABSTRACT

A golf ball has a surface uniformly covered with a paint coat so that carrying properties of dimples can be stably elicited. A paint to which is applied a voltage of more than 50,000 V is supplied to a disk revolving at a speed of more than 15,000 rpm for atomization, the atomized paint being coated on the surface of the golf ball to form a paint coat within a thickness range of 5 to 60 μm, with a maximum/minimum coat thickness ratio of 1 to 2.

10 Claims, 1 Drawing Sheet

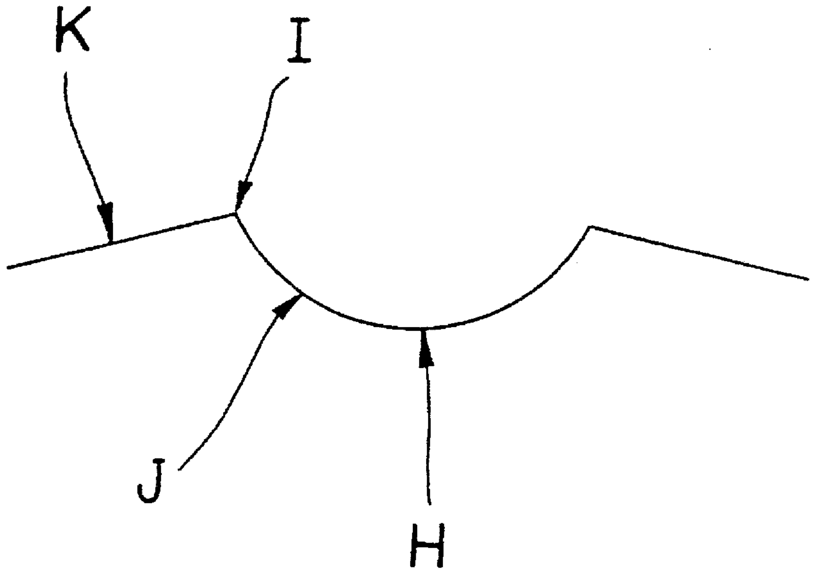
K
I
J
H

GOLF BALL AND METHOD OF MANUFACTURING THE SAME

This is a continuation-in-part of application Ser. No. 08/163,720, filed on Dec. 9, 1993, now abandoned.

BACKGROUND OF THE INVENTION

1. Field of the Invention

This invention relates to a golf ball which can stably elicit carrying or flight properties of dimples and a method of manufacturing the same.

2. Description of the Prior Art

A golf ball has its surface covered with a coat formed of both enamel paint and clear paint, or clear paint alone, so that the ball may be kept clean in its outer appearance and prevented from dirt depositing thereon.

The golf ball is formed on its surface with depressions, called dimples, which are intended to help produce a certain carry.

However, in order to stably elicit carrying properties of which dimples are possessed, it is necessary that the coat of paint which covers the surface of the golf ball must be uniformly distributed. With air gun painting, for example, that is one of the painting techniques commonly used in the art, it is impractical to uniformly coat the interior of each dimple. In particular, where the paint is thickly applied through a few times of painting, the edge portion of each dimple is, in effect, coated relatively thin; further, the resulting coat involves considerable variations in thickness from part to part of the ball.

Instead of the above discussed air gun painting, attempts have been made to coat the surface of a golf ball by electrostatic painting. However, with the electrostatic painting method employed so far, it has been not possible to positively elicit carrying properties of dimples, because the method can only produce a coat of paint which is excessively thick.

SUMMARY OF THE INVENTION

The present invention is directed to overcoming the above mentioned problems with the prior art, and accordingly it is an object of the invention to provide a golf ball including a surface coat capable of stably eliciting carrying properties of dimples.

According to the invention, the golf ball has a surface covered with a coat of paint which is within a thickness range of 5 to 60 μm, the ratio of maximum to minimum coat thickness being 1 to 2 so that carrying properties of dimples can be stably brought out. A coat of paint of such uniform thickness is formed by supplying a paint to which a voltage of more than 50,000 V to a disk revolving at a velocity of more than 15,000 rpm for atomization, and coating the atomized paint on the surface of the golf ball.

DETAILED DESCRIPTION OF THE INVENTION

First, the thickness and thickness uniformity of the coat of paint covering the surface of the golf ball will be discussed. When the thickness of the coat is less than 5 μm, the coat lacks durability and its gloss will be lost as a result of several strokes given to the ball. When the coat thickness is more than 60 μm, even if coating is uniformly effected, dimples lose their pre-coat configuration with the result that their carrying properties will change.

In the invention, therefore, the thickness of the coat is specified to be within the range of 5 to 60 μm, especially preferably within the range of 10 to 30 μm. The ratio of maximum to minimum coat thickness (maximum coat thickness/minimum coat thickness) represents the degree of uniformity of the coat. When the ratio is greater than 2, the uniformity of the coat is lost, and dimples lose their pre-coat configuration, which results in changes in the carrying properties of dimples.

Next, methods for coat formation will be discussed. Air gun painting is known as a painting method for forming a coat of paint. In order to form such a coat by air gun painting, however, it is necessary that a few coats of paint, each of 2 to 3 μm in thickness, must be applied, which results in level degradation and unsightly appearance.

Where the conventional electrostatic painting method is employed, it is impractical to run a disk at a rotational speed of more than 10,000 rpm. Therefore, paint atomization by the coating machine does not provide paint particles of sufficiently fine size. Consequently, the paint coat at the edge portion of each dimple is thinner than that at other portion of the dimple, no uniform coat being obtainable within the thickness range of 5 to 60 μm, with respect to the edge portion.

Hence, according to the invention, a paint to which has been applied a voltage of more than 50,000 V is supplied to a disk revolving at a speed of more than 15,000 rpm for atomization, and the atomized paint is coated on the surface of the golf ball to form a paint coat.

In other words, since the paint is supplied to the disk which is rotating at such a high velocity as more than 15,000 rpm for atomization of the paint, fine paint particles can be obtained, so that the coat at the edge portion of each dimple can be formed to a thickness similar to that at other portion of the dimple. Thus, it is possible to obtain a uniform coat that is within a thickness range of 5 to 60 μm, with the ratio of maximum to minimum coat thickness being less than 2.

According to the present invention, in carrying out electrostatic coating, the voltage applied to the paint is more than 50,000 V, preferably more than 80,000 V, especially preferably 90,000 to 120,000 V. The speed of rotation of the disk is preferably more than 15,000 rpm, especially preferably 25,000 to 35,000 rpm.

It is preferable that the surface of the golf ball to which a paint coat is to be applied is previously coated with an electroconductive agent so as to readily enable the ball to adsorb charged paint particles. For such conductive agent, quaternary amine or the like is preferred which will adsorb airborne moisture after it is coated on the golf ball.

Preferably, charged paint particles are applied to enclose the golf ball; and it is especially preferable that they are applied from the lower portion of the ball. Also, it is preferable that the golf ball is kept in rotation during the process of coating.

According to the invention, it is possible to uniformize the paint coat covering the surface of the golf ball, thereby to stably elicit carrying properties of the dimples.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus is not limitative of the present invention, and wherein:

The Fig. is a view schematically illustrating a dimple and its periphery on the surface of the golf ball of the invention.

DETAILED DESCRIPTION OF THE PREFERRED EMBODIMENTS

To further illustrate the invention, the following examples are given together with comparison examples.

Examples 1 to 4, and Comparison Examples 1 to 8

Golf balls were formed on their respective surfaces with dimples according to the following specifications and were subjected to surface coating. Evaluation was made with respect to their characteristics.

1. Golf balls used:

Two-piece golf balls each comprising a core formed by vulcanizing a rubber composition, and a cover formed principally of an ionomer rubber, the core being covered with the cover.

2. Number of dimples formed on each golf ball:

Dimples were formed in either of the following two ways, with respect to their number.

A: 432

B: 342

3. Coating methods:

C: electrostatic painting; disk diameter 80 mm

D: electrostatic painting; disk diameter 200 mm

E: air gun painting, 1 time coat

F: air gun painting, 2 time coat

G: electrostatic painting; disk diameter 200 mm

In electrostatic painting C, D and G, the voltage applied to the paint was 90,000 V, and speed ranges of disk rotation were C: 25,000 to 35,000 rpm; D: 7,000 to 9,000 rpm; and G: 7,000 to 9,000, as shown in Table 1 given hereinafter.

The speed of ball rotation during the process of electrostatic painting was 50 rpm. After painting, each ball was dried at a temperature of less than 50 ° C. for 24 hours. In cases C, D and G, for the purpose of electrostatic painting, the surface of the ball was previously coated with Plaslac Electroconductive Agent NC (trade name; available from Cashew Co.) that had been diluted with isopropyl alcohol to a concentration of 1%. Also, Texaquartz 879N (trade name: available from San Nepco Limited) and containing an 80% diluted solution of tetraalkylammonium ethylsulfate could be used. In cases E and F for air gun painting, the pressure applied during the painting process was 2 kg/cm$^2$.

4. Paint

Clear paint only was used. The paint is composed of the following ingredients.

| Ingredients | Parts by Weight |
|---|---|
| Polyester polyol[1] | 100 |
| An adduct of hexamethylene diisocyanate and trimethylol propane[2] | 82 |
| Dibutyltin dilaurate | 0.005 |
| Thinner[3] | 222 |

-continued

| Ingredients | Parts by Weight |
|---|---|

[1]A polymer synthesized from 30.0 wt % of neopentyl glycol, 14.0 wt % of triethylene glycol and 5.0 wt % of tris-2-hydroethyl isocyanulate.
[2]Available from Dainippon Ink & Chemicals Inc., having an NCO content of 12.0 wt % and a nonvolatile content of 75 wt %
[3]A mixture of 30 parts by weight of toluene, 40 parts by weight of ethyl acetate and 40 parts by weight of methyl isobutyl ketone.

Coating amounts on sample balls were: 200 mg one minute after coat application, in each of cases C to E; 100 mg in case F; and 500 mg in case G.

5. Manner of Evaluation

Evaluation was made on four items: appearance, coat thickness, maximum coat thickness/minimum coat thickness, and carrying property or flight performance.

(1) Appearance:

For each example, 12 golf balls were visually observed in respect of their appearance. Observation results are expressed on the basis of the following evaluation criteria:

0: generally uniform in color and dimples are clearly contoured;

Δ: dimple edge portion is slightly lighter in color than other portion, but dimples are clearly contoured; and x: dimple edge portion is noticeably different in color from other portion, or dimples are not clearly contoured.

(2) Coat thickness:

Using 12 golf balls as samples, measurements were made with three portions of each golf ball, at four positions designated H, I, J and K in FIG. 1; and with respect to each measured portion, the average of coat thickness values measured at the four positions was taken as the coat thickness of that particular portion.

On the basis of the measurements, the average for each golf ball was determined.

Then, an average was determined for the 12 golf balls. Evaluation results are shown in overall average values and R (difference between maximum value and minimum value) values.

Referring to the figure, there is schematically shown a portion of a golf ball including a dimple and its periphery on the surface of the ball. In the drawing, H, I, J, K represent the following positions.

H: dimple center, or deepmost portion of the dimple;

I: edge portion of the dimple;

J: midportion between the dimple center and the edge portion; and

K: peripheral surface portion of the dimple.

(3) Max. coat thickness / min. coat thickness:

Calculated on the basis of the measurements of coat thickness in (2) above. The results are shown in both average and R values.

(4) Carrying property:

In each example, 12 golf balls were used as samples, which were tested by employing a swing robot of True Temper's make in such a way that each ball was hit by a No. 1 wood club at a head speed of 45 m/s. The carry of the ball and the height of its flight trajectory were measured. The results are shown in both average and R values. Tests were carried out under the conditions of no wind and 24° C.

The height of the flight trajectory of each hit ball is expressed by the angle which a straight line connecting between the highest point of the trajectory and the point of hitting makes with the horizontal.

The appearance evaluation results, coat thickness measurement results, and maximum coat thickness/minimum coat thickness ratios are shown in Table 1, and the carrying property measurement results are shown in Table 2.

TABLE 1

| | | | Coating | | | | | Max. coat thickness/ | |
|---|---|---|---|---|---|---|---|---|---|
| | | No. of | | Rotary speed | | Coat thickness (μm) | | Min. coat thickness | |
| | No. | dimples | Method | (rpm) | Appearance | Aver. | R | Aver. | R |
| Example | 1 | A | C | 25,000 | O | 18.5 | 2.1 | 1.53 | 0.24 |
| | 2 | A | C | 30,000 | O | 19.3 | 1.4 | 1.31 | 0.20 |
| | 3 | A | C | 35,000 | O | 18.1 | 1.9 | 1.61 | 0.31 |
| | 4 | B | C | 30,000 | O | 19.5 | 1.7 | 1.40 | 0.26 |
| Comparison example | 1 | A | D | 7,000 | x | 18.6 | 4.5 | 4.80 | 1.80 |
| | 2 | A | D | 9,000 | x | 18.9 | 3.0 | 2.30 | 0.60 |
| | 3 | B | D | 9,000 | x | 19.4 | 2.3 | 2.40 | 0.60 |
| | 4 | A | E | — | x | 18.8 | 10.9 | 7.80 | 3.50 |
| | 5 | B | E | — | x | 19.1 | 11.2 | 8.80 | 3.20 |
| | 6 | A | F | — | Δ | 19.6 | 8.3 | 2.60 | 0.80 |
| | 7 | B | F | — | Δ | 18.9 | 7.8 | 2.50 | 0.70 |
| | 8 | A | G | 9,000 | x | 65.3 | 20.0 | 1.50 | 0.21 |

TABLE 2

| | | Carrying property | | | |
|---|---|---|---|---|---|
| | No. of | Carry (yard) | | Height of flight trajectory (°) | |
| No. | dimples | Aver. | R | Aver. | R |
| Example | | | | | |
| 1 | A | 231.3 | 1.2 | 13.8 | 0.20 |
| 2 | A | 231.7 | 1.1 | 13.7 | 0.20 |
| 3 | A | 231.0 | 1.1 | 13.8 | 0.10 |
| 4 | B | 230.8 | 1.6 | 13.4 | 0.20 |
| Comparison example | | | | | |
| 1 | A | 230.5 | 3.0 | 14.0 | 0.50 |
| 2 | A | 230.9 | 2.1 | 13.8 | 0.40 |
| 3 | B | 229.3 | 2.2 | 13.6 | 0.40 |
| 4 | A | 228.1 | 3.9 | 14.9 | 0.80 |
| 5 | B | 226.4 | 4.1 | 14.6 | 0.80 |
| 6 | A | 230.3 | 2.5 | 14.1 | 0.50 |
| 7 | B | 228.5 | 4.7 | 13.9 | 0.60 |
| 8 | A | 210.5 | 1.7 | 17.5 | 0.21 |

As may be appreciated from Table 1, balls of Examples 1 to 4 are all satisfactory in appearance and within a coat thickness range of 5 to 60 μm, with a maximum coat thickness/minimum coat thickness ratio registered lower than 2, which shows good uniformity of coat thickness. Therefore, as Table 2 shows, balls of Examples 1 to 4 exhibited a greater carry than balls of comparison examples having corresponding numbers of dimples, stably eliciting the potential flight performance of dimples.

In contrast to this, balls of Comparison Examples 1 to 8 are all unsatisfactory in appearance and, although balls of Comparison Examples 1 to 7 are within a coat thickness range of 5 to 60 μm anyhow, they have a maximum to minimum coat ratio greater than 2, showing lack of coat thickness uniformity. In Comparison Example 8, in which the coat thickness is particularly large, dimples of each ball have lost their pre-coat configuration and, therefore, the flight performance or carrying property of the ball is rather low as shown in Table 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a golf ball comprising the steps of supplying a paint to which a voltage of more than 50,000 V is applied to a disk, rotating the disk at a velocity of more than 15,000 rpm for atomization, coating atomized paint from the disk on the surface of the golf ball at a thickness of 5 to 60 μm with a ratio of maximum to minimum of the coating being 1 to 2.

2. The method according to claim 1 wherein the applied voltage is more than 80,000 V.

3. The method according to claim 1 wherein the applied voltage is 90,000 to 120,000 V.

4. The method according to claim 1, wherein the disk is rotated at a velocity of 25,000 to 35,000 rpm.

5. The method according to claim 1 wherein said golf ball is pretreated with an electroconductive agent.

6. The method according to claim 5, further comprising the step of using a quaternary amine as the electroconductive agent.

7. The method according to claim 1, further comprising the step of rotating the golf ball during the step of coating.

8. The method according to claim 7, wherein the step of rotating includes rotating the ball at 50 rpm.

9. The method according to claim 1, wherein a plurality of golf balls are simultaneously coated with atomized paint during the step of coating.

10. The method according to claim 1, further comprising the step of rotating the golf ball during the step of coating and wherein a plurality of golf balls are simultaneously coated with atomized paint during the step of coating.

* * * * *